(12) United States Patent
Fiegel (10) Patent No.: US 11,628,480 B1
(45) Date of Patent: Apr. 18, 2023

(54) FUME COLLECTION

(71) Applicant: Metal-Fab, Inc., Wichita, KS (US)

(72) Inventor: John Fiegel, Wichita, KS (US)

(73) Assignee: METAL-FAB, INC., Wichita, KS (US)

( * ) Notice: Subject to any disclaimer, the term of this patent is extended or adjusted under 35 U.S.C. 154(b) by 774 days.

(21) Appl. No.: 16/581,056

(22) Filed: Sep. 24, 2019

Related U.S. Application Data (60) Provisional application No. 62/735,578, filed on Sep. 24, 2018.

(51) Int. Cl.
*B01D 46/46* (2006.01)
*B01D 46/52* (2006.01)
*B01D 46/00* (2022.01)
*B08B 15/00* (2006.01)

(52) U.S. Cl.
CPC ........ *B08B 15/002* (2013.01); *B01D 46/0035* (2013.01); *B01D 46/52* (2013.01)

(58) Field of Classification Search
CPC ........ B01D 46/00; B01D 46/52; B01D 46/46; B01D 46/0035; B08B 15/00; B08B 15/002
See application file for complete search history.

(56) References Cited

U.S. PATENT DOCUMENTS

| | | | | |
|---|---|---|---|---|
| 3,710,554 A * | 1/1973 | Brookman | ............. | B01D 47/06 55/460 |
| 4,172,865 A * | 10/1979 | Steier | ................... | B01D 47/021 261/119.1 |
| 4,287,635 A * | 9/1981 | Jacobs | ................ | A47L 11/4027 15/328 |
| 4,597,780 A * | 7/1986 | Reif | ......................... | B03C 3/16 96/45 |
| 5,199,963 A * | 4/1993 | Scarp | ...................... | A47L 9/181 96/331 |
| 5,378,265 A * | 1/1995 | Pearl | ...................... | B01D 47/18 95/219 |
| 6,660,070 B2 * | 12/2003 | Chung | ................. | B01D 46/442 96/417 |
| 7,105,037 B2 * | 9/2006 | Olander | ................ | B01D 53/74 55/467 |
| 7,198,659 B1 * | 4/2007 | Fanguy | .............. | B01D 19/0042 55/342 |
| 2001/0050284 A1* | 12/2001 | Jaeger | ....................... | B65F 1/04 220/571 |
| 2008/0083333 A1* | 4/2008 | Yokoi | .................. | B01D 46/681 55/385.2 |
| 2010/0229725 A1* | 9/2010 | Farsad | ................... | B01D 53/64 261/36.1 |
| 2012/0174650 A1* | 7/2012 | Ariessohn | ............ | G01N 1/2202 73/23.2 |
| 2014/0366721 A1* | 12/2014 | Roy | ..................... | B01D 46/444 55/467 |

\* cited by examiner

*Primary Examiner* — Minh Chau T Pham
(74) *Attorney, Agent, or Firm* — Hall Estill Law Firm; Mitchell McCarthy (57) ABSTRACT

Apparatus and associated methodology for collecting fumes, such as in a welding process environment. A collection apparatus has a wet collector enclosure defining an inlet, a dry collector enclosure defining an outlet, and a blower inside a plenum between the wet collector enclosure and the dry collector enclosure, the blower configured to move fumes into the inlet and out of the outlet.

20 Claims, 8 Drawing Sheets

FUME COLLECTION

RELATED APPLICATION

This application claims entitlement to the earlier filing date of U.S. Provisional Patent Application No. 62/735,578 filed on Sep. 24, 2018 and entitled WELDING FUME COLLECTION.

BACKGROUND

Exposure to metal dust particles in welding fumes is a leading cause of health problems for factory workers, such as eye and respiratory irritations, headaches, and fatigue. Manganese, for example, the primary metal in welding wire, can give workers headaches and cause them to feel exhausted, apathetic and weak. Chronic overexposure to such fumes leads to a condition known as "manganism," which is characterized by neurological and neurobehavioral health problems. The permissible exposure limit for manganese is 5.0 milligrams per cubic meter time-weighted-average. Manganese is the trigger for the EPA's Rule 6x provision of the Clean Air Act.

Hexavalent Chromium or CR(VI) is a carcinogenic substance produced during welding or other types of "hot work" on stainless steel and other metals that contain chromium, or are coated with it. Hex chrome overexposure can result in short-term upper respiratory symptoms, and eye or skin irritations. The greatest long-term health concern associated with hex chrome exposure is lung cancer. Other adverse health effects include damage to the upper respiratory system, and allergic and irritant contact dermatitis. Respiratory tract problems can include inhalation damage to mucus membranes, perforation of septum tissue between the nostrils of the nose, and damage to the lungs. In addition, there may be injury to the eyes, skin, liver, and kidneys. Once in the body, hex chrome typically targets some of the body's organs. A worker exposed to hex chrome may also experience symptoms such as sinus irritation, nosebleeds, stomach and nose ulcers, skin rash, chest tightness, wheezing and shortness of breath. The current OSHA permissive exposure limit for hex chrome 5.0 micrograms per cubic meter time-weighted-average, with the action level at 2.5 micrograms per cubic meter.

Zinc Oxide is another pollutant that is generated by hot work on galvanized steel. Exposure can result in a condition known as "metal fume fever," a short-term illness having severe flu-like symptoms. The current permitted exposure limit for zinc oxide is 5.0 milligrams per cubic meter time-weighted-average.

Improvements are needed to reduce the impacts of these and other harmful fumes on factory workers, and on the air quality where these fumes are exhausted outside the factories. It is to those improvements that embodiments of this technology are directed.

SUMMARY

Some embodiments of this technology contemplate a fume collection apparatus having a wet collector enclosure defining an inlet. A liquid bath is disposed inside the wet collector enclosure. An inlet baffle is also disposed inside the wet collector enclosure, defining a channel from the inlet to a subsurface of the liquid bath. A blower is in fluid communication with the wet collector enclosure and configured to draw fumes through the inlet, channel, and the liquid bath.

Some embodiments of this technology contemplate a fume collection apparatus having a wet collector enclosure defining an inlet, a dry collector enclosure defining an outlet, and a blower inside a plenum between the wet collector enclosure and the dry collector enclosure, the blower configured to move fumes into the inlet and out of the outlet.

Some embodiments of this technology contemplate a fume collection apparatus, having a wet collector enclosure defining an inlet, a dry collector enclosure defining an outlet, and means for moving fumes into the inlet and out of the outlet.

BRIEF DESCRIPTION OF THE DRAWINGS

Details of various embodiments of the present technology are described in connection with the accompanying drawings that bear similar reference numerals.

DESCRIPTION

Initially, this disclosure is by way of example only, not by limitation. The illustrative constructions and associated methods disclosed herein are not limited to use or application for any specific system or in any specific environment. That is, the disclosed technology is not limited to usage for collecting welding fumes. Thus, although the instrumentalities described herein are for the convenience of explanation, shown and described with respect to exemplary embodiments, the skilled artisan understands that the principles herein may be applied equally in other types of environments conducive to combined wet and dry filtering.

The disclosed embodiments of the present technology are aimed at improvements in the art of robotic welding, and more particularly to fume collection and disposal in a welding process environment. Typical industries that use this manufacturing process are automotive manufacturers, agricultural equipment and implement manufacturers, aircraft manufacturers, sub-component manufacturers, as well as multiple others. In addition to the robotic welder itself, a robotic welding cell can advantageously include a fume (smoke and particulate) collector connected to ductwork to capture and dispose of the welding fumes. Flexibility of design is important because these industries can have frequent layout changes to the production space to accommodate changes in product and/or production rates.

For collecting welding fumes, previously attempted solutions generally employ dry media type collectors, such as cartridge type dust collectors. The cartridges can be implemented in a variety of form factors and collection schemes. They can be sized to be individually dedicated (single robot to single collector) or distributed (multiple robots to a single collector). Problematically, however, the welding process typically produces sparks and embers that can be transported to the dry filter, igniting the collected particles and filtering media. Improperly sized ductwork can diminish the transport velocity to the point allowing buildup of collected combustible particulates, increasing the likelihood of a fire breaking out in the duct system. This risk arises every time the ductwork is modified to accommodate changes to the machine layout.

At a minimum, spark arresting devices are used to guard against the risk of fire in the ductwork and collector. Additionally, spark detection and fire suppression systems are also incorporated to further safeguard against fires. Indoor dry type dust collection installations require the addition of explosion protection to meet the OSHA NEP for combustible dust and NFPA 652 & NFPA 654 standards. All of these additional fireproofing safeguards add cost to the fume collection system, making some previously attempted solutions cost prohibitive.

High-efficiency particulate air (HEPA) filters are also sometimes employed in dry collection systems. HEPA filters are capable of capturing small particulates, such as tobacco smoke. HEPA filters are also quite expensive. Under the characteristic duty cycle and harsh conditions associated with collecting welding fumes, the life span of a HEPA filter has been observed to be no more than a few days. The cost of frequent replacement makes HEPA filtering cost prohibitive.

Wet collectors are used in some other environments for capturing other airborne particulates, such as dust, powders, filings, and the like. Wet type collectors force the collected airstream through a self-contained water bath. Such an agitated water bath, as a filter media, is capable of capturing large particulates from the airstream, generally on the order of about ten microns and larger. Welding smoke particles are as small as three microns, however, so they simply pass through the water bath unabated.

Figure 1:
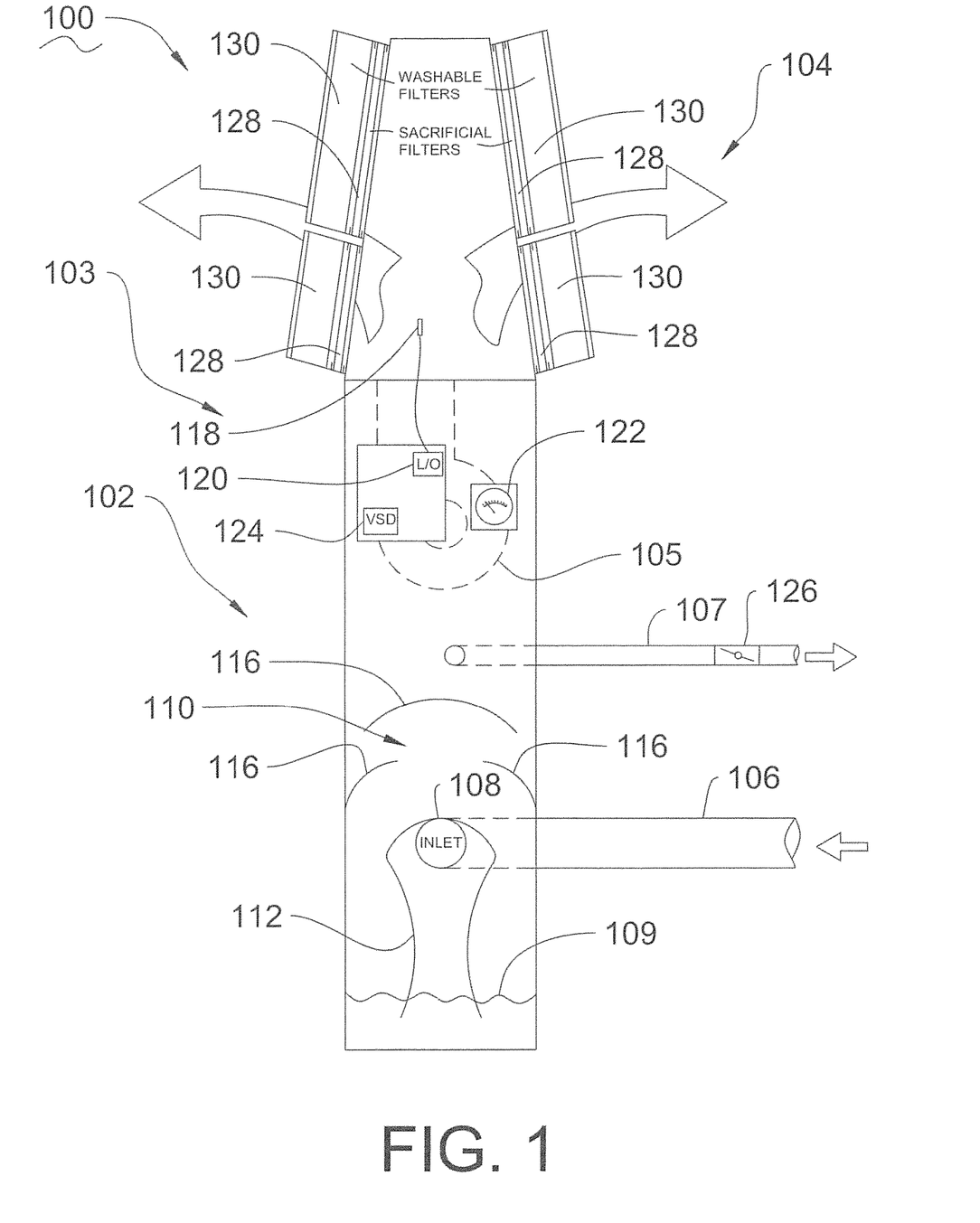
FIG. 1 diagrammatically depicts a fume collector that is constructed in accordance with illustrative embodiments of this technology.

The present technology combines wet and dry filtering to create an effective and efficient, compact and portable welding fume collector that is easily relocated when layout changes occur. FIG. 1 diagrammatically depicts a welding fume collector 100 that is constructed in accordance with illustrative embodiments of this technology. The collector 100 generally has a wet collector 102 followed by a dry collector 104. A blower 105 resides in a plenum 103 between the wet and dry collectors 102, 103. In alternative equivalent embodiments the blower can be located elsewhere, such as upstream of both wet and dry collectors 102, 104 or downstream of both wet and dry collectors 102, 104.

In these illustrative embodiments, activating the blower 105 creates an upstream negative pressure propagating to an inlet duct 106. A user positions the distal end of the inlet duct 106 near the welding activity, so that the welding fumes are drawn into the inlet duct 106 and, in turn, through an inlet 108 in the wet collector 102. After passing through the wet collector 102, the fumes are pressurized by the blower 105 in the plenum 103 which exhausts them through the dry collector 104 to the ambient environment.

The wet collector 102 contains a water bath 109 for wetting the welding fumes, extinguishing entrained embers and capturing large particulates. This prevents high temperature fumes from damaging the dry media, and reduces the amount of particulates that reach the dry media in the dry collector 104. A baffle arrangement 110 in the wet collector 102 includes an inlet baffle 112 forming a channel that guides the fumes from the inlet 108 to an exit 114 that is below the surface (in the subsurface) of the water bath 109. After exiting the channel, the fumes are mixed by flowing in tortuous paths between a number of overlapping baffles 116, increasing exposure of the embers and hot particulates to the cooling and filtering effects of the water bath 109.

Figure 7:
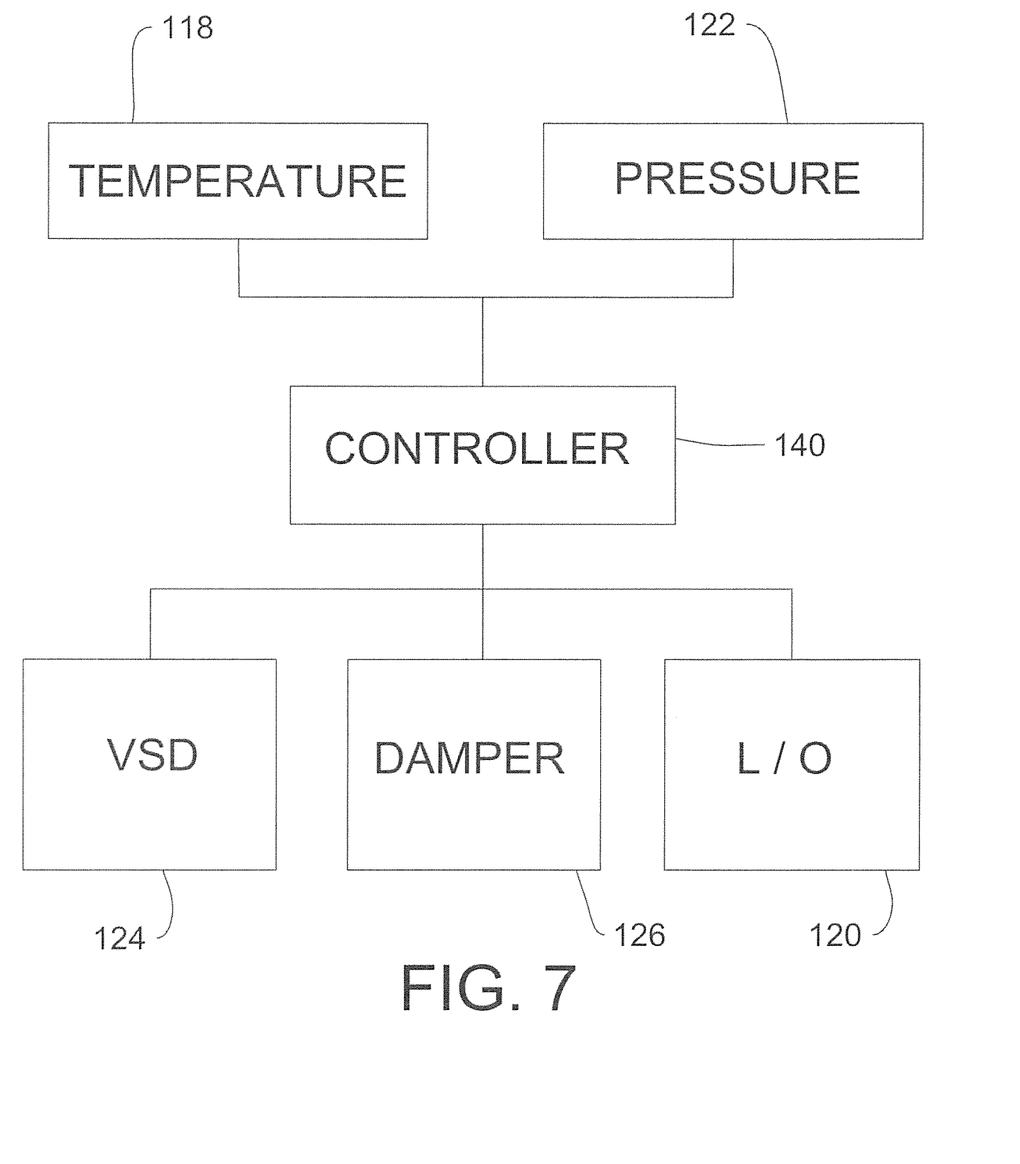
FIG. 7 is a functional depiction of the controls in the fume collector of FIG. 1.
Figure 8:
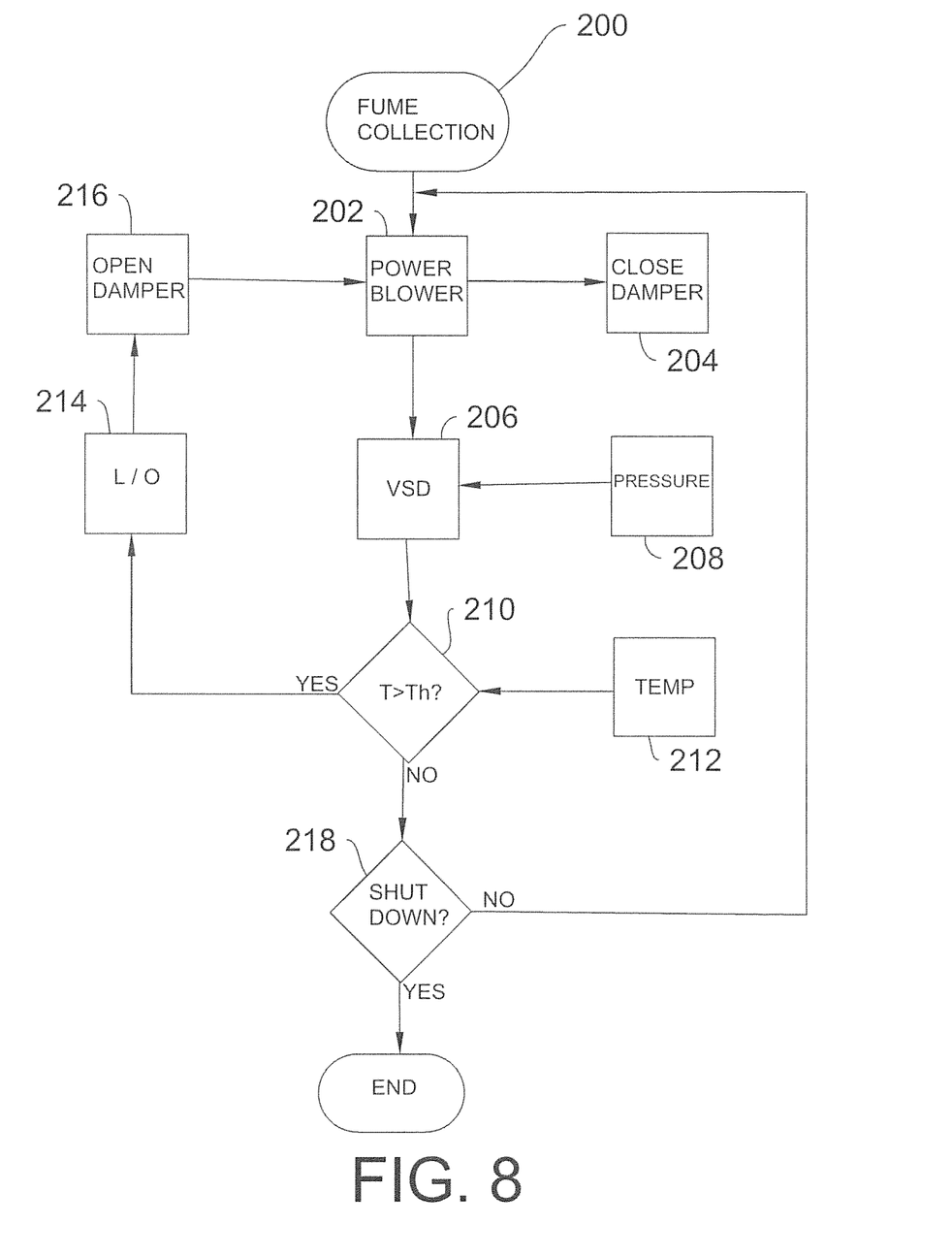
FIG. 8 is a flowchart depicting steps in a method for fume collection in accordance with illustrative embodiments of this technology.

The controls include a temperature probe 118 providing parametric input to a lockout circuit 120 that shuts the blower 105 down if temperatures downstream of the water bath 109 exceed a predetermined limit. A processor-based controller monitors a pressure transducer 122, and responsively executes programming that controls a variable speed drive 124 for the blower 105 to maintain the airflow through the collector at a constant rate regardless of external pressure changes. When the blower 105 is energized, a motorized damper 126 in an exhaust duct 107 is closed. When the blower 105 is de-energized, the motorized damper 126 is opened to facilitate off-gassing of the water bath 109 in accordance with NFPA 484. In illustrative reductions to practice the motorized damper was provided by an Ultra-Zone model slip-in damper marketed by EWC Controls, Incorporated of Englishtown, N.J.

The cooled and water-filtered fumes are then exhausted through the dry collector 104, which in these illustrative embodiments is constructed of an A-frame arrangement of two filter banks. The fumes first flow through a sacrificial oil scrim pre-filter 128 followed by a pleated hydrophobic filter 130. The A-frame filter media configuration, incorporating the oil scrim pre-filter, is proven to be a useful technology for the robotic weld industry. Without the oil scrim filter 128 or by using a standard HEPA filter, the filters would require replacement in just a couple of days. The present technology extends filter life to at least several weeks, extending it to months in some observed applications, therefore making it a significant improvement in the art. The combination system is designed to meet and/or exceed the requirements of the OSHA combustible dust NEP, as well NFPA 484 and NFPA 652.

Figure 2:
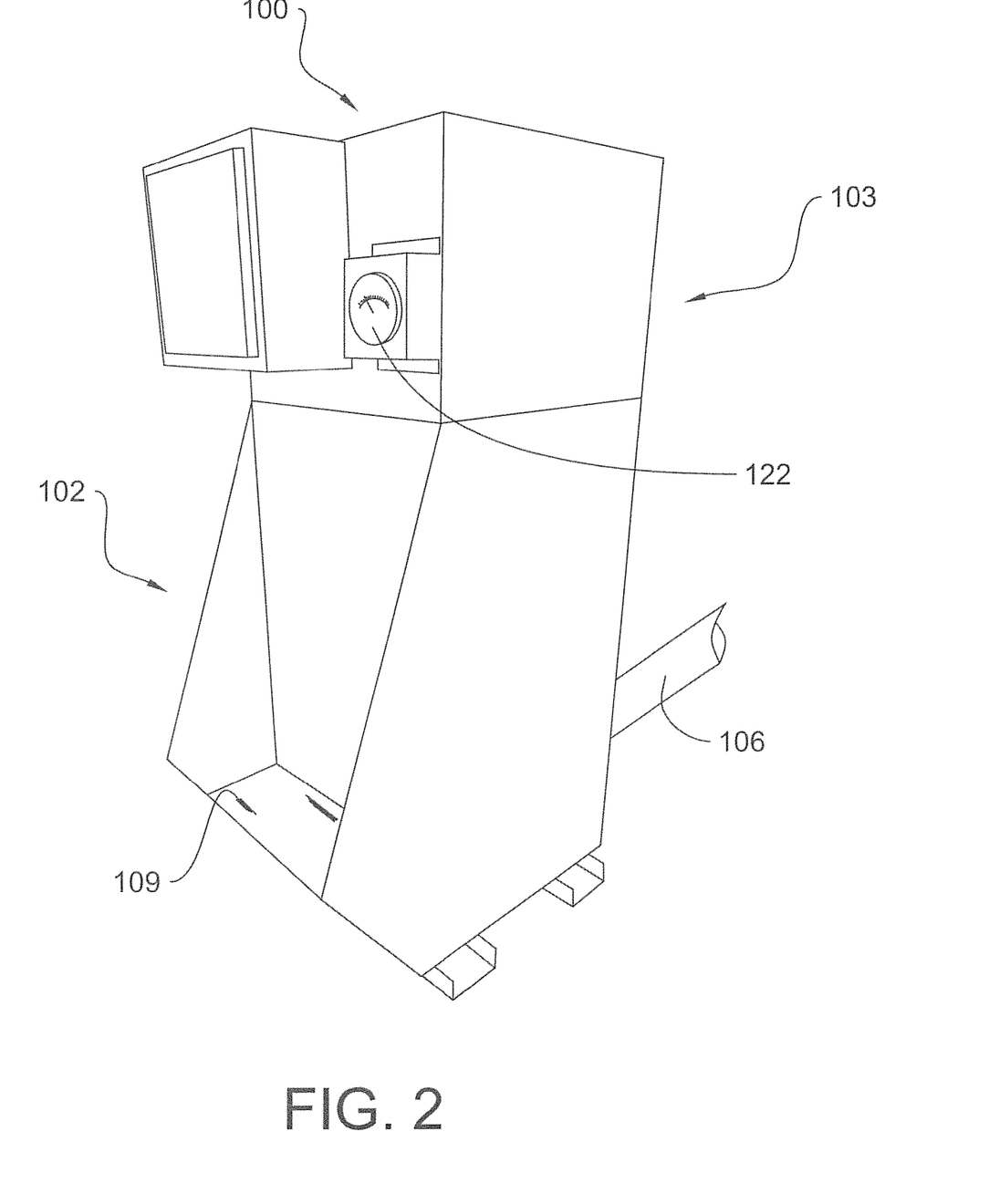
FIG. 2 is an isometric depiction of the fume collector of FIG. 1.
Figure 3:
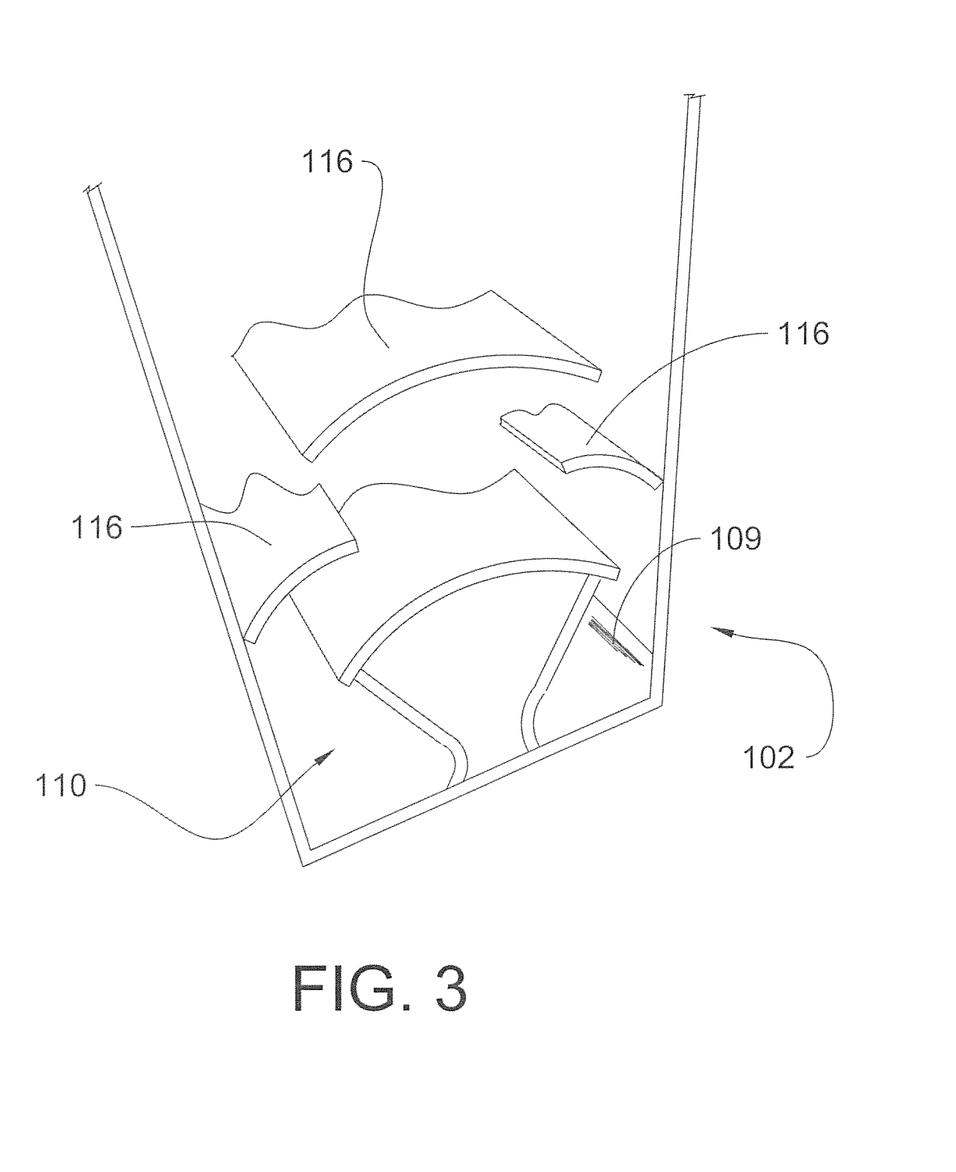
FIG. 3 depicts a baffle arrangement inside the wet collector enclosure portion of the fume collector of FIG. 1 in accordance with illustrative embodiments of this technology.
Figure 4:
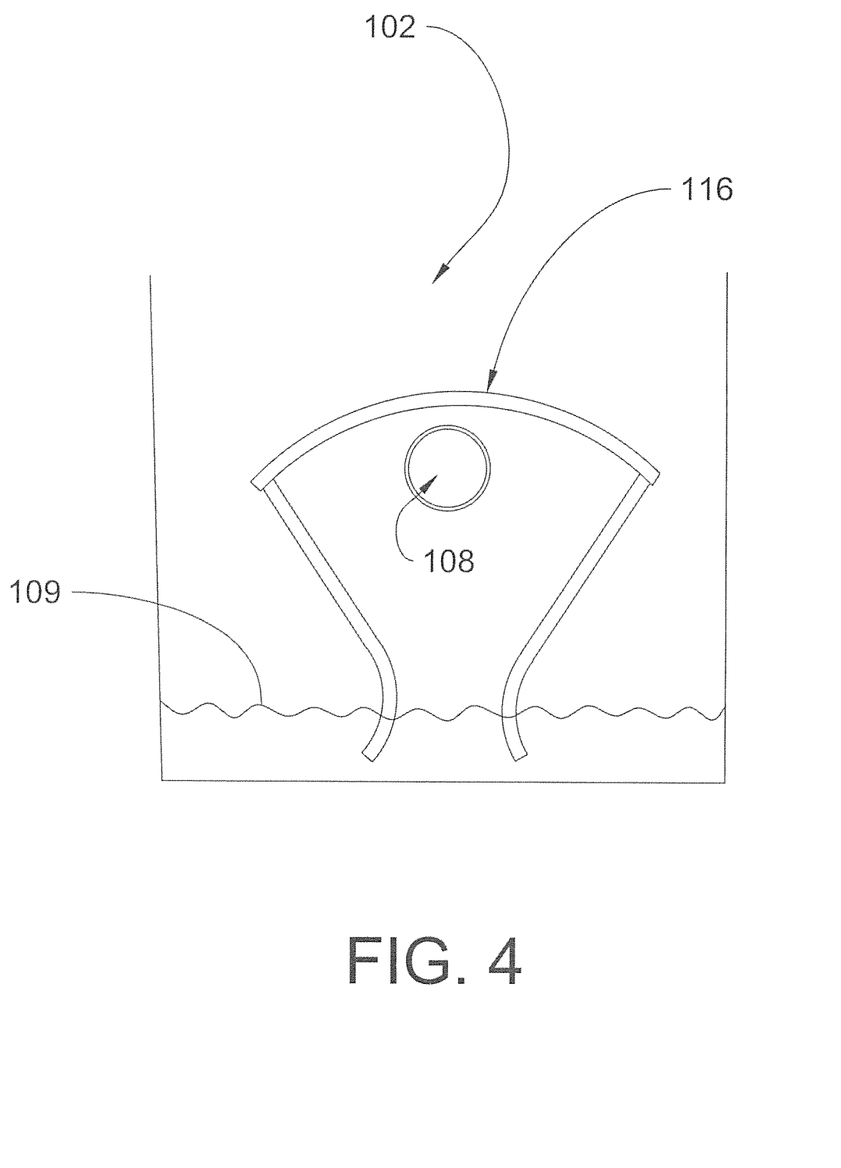
FIG. 4 is an enlarged portion of FIG. 3.
Figure 5:
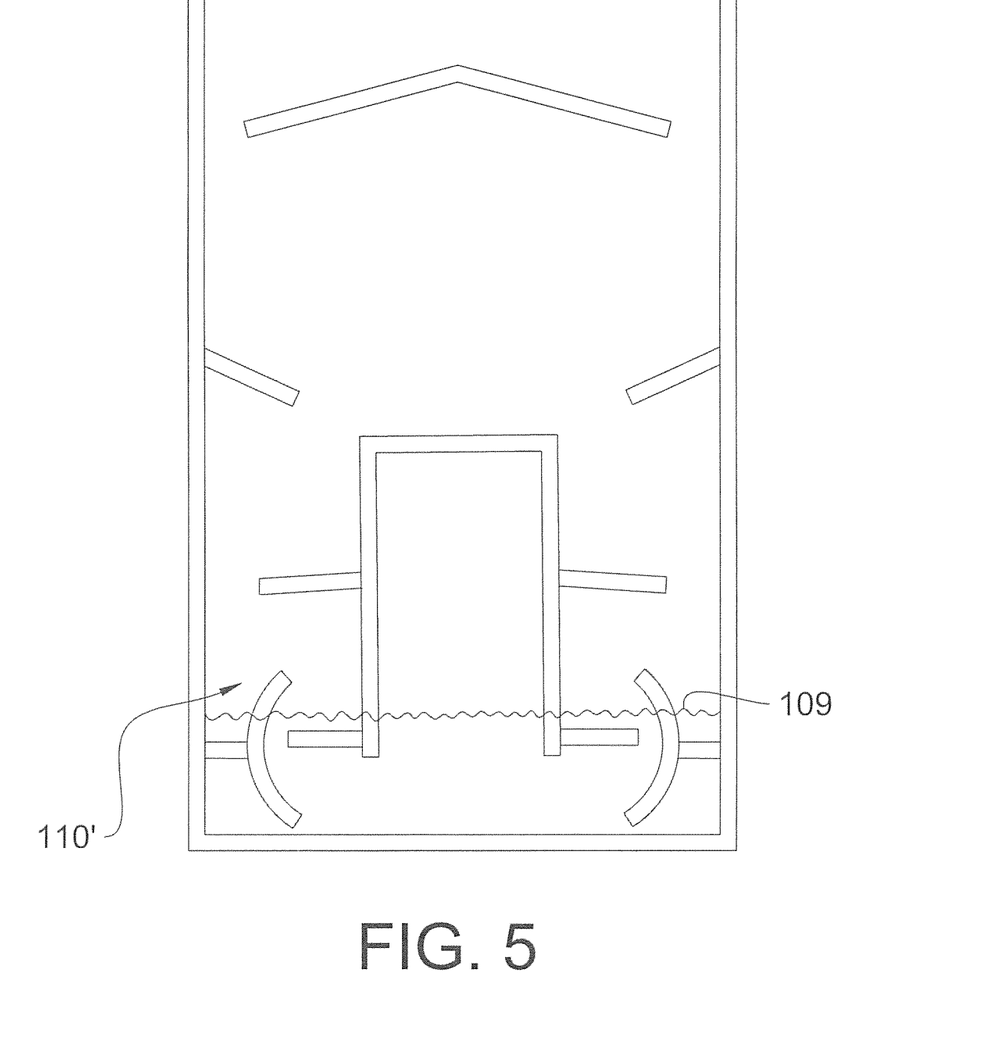
FIG. 5 depicts another baffle arrangement in the fume collector of FIG. 1 in accordance with alternative embodiments of this technology.

FIG. 2 is an isometric depiction of the wet collector 102 and plenum 103 portions of the fume collector 100 apparatus of FIG. 1. FIG. 3 depicts the baffle arrangement 110 in the wet collector 102 used in illustrative embodiments of this technology. FIG. 4 depicts a different perspective of the baffle arrangement 110, showing the inlet 108 surrounded by the baffle channel that introduces the collected fumes below the static level of the water bath 109. FIGS. 3 and 4 also depict how the water bath 109 level is set low enough and the flow velocity is set high enough so that the flow churns and agitates the water bath 109 to gain all the cooling advantages while also minimizing the flow losses through the wet collector 102. FIG. 5 depicts a different baffle arrangement 110' that is constructed in accordance with equivalent alternative embodiments of this technology.

Figure 6:
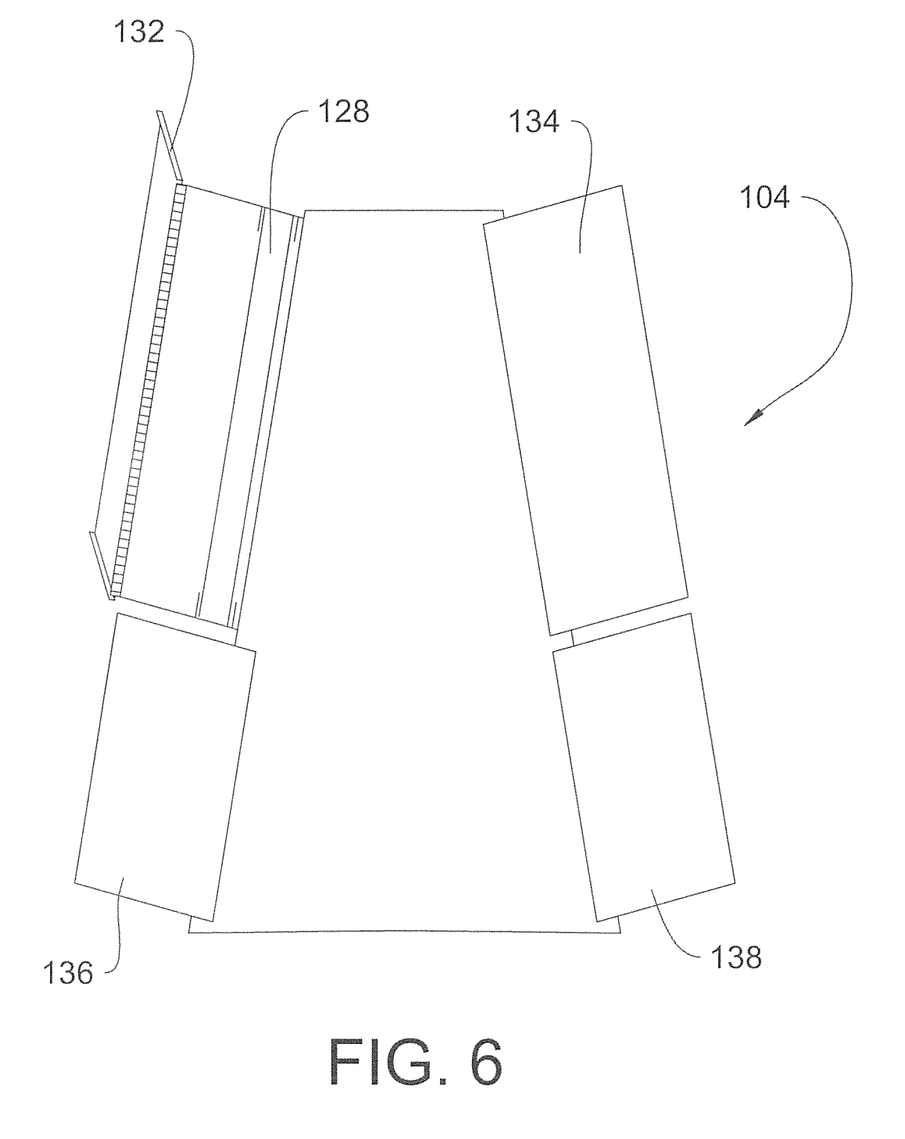
FIG. 6 depicts the dry collector enclosure in the fume collector of FIG. 1.

FIG. 6 is a side depiction of the dry collector 104 of these illustrative embodiments. Opposing top filter frames 132, 134 and opposing bottom filter frames 136, 138 each contain a sacrificial filter 128 and a pleated hydrophobic filter (not depicted). The filter frame 132 is depicted with its hinged access door opened, with the pleated hydrophobic filter having been removed such as for cleaning purposes.

In successful reductions to practice the sacrificial oil scrim filter 128 is constructed of a multi-denier, dual-density polyester media having a holding capacity of about 175-225 grams. The media is antimicrobial, air laid, heavy tack, with multiple filtration zones. The filter measures about 25.5 inches wide, 22.5 inches tall, and one inch thick. It has a continuous temperature rating of 175 degrees Fahrenheit, and a spike temperature rating of 210 degrees Fahrenheit. Its MERV classification is MERV10. The recommended airflow is 2000 cubic feet per minute at a velocity of 500 feet per minute. Pressure drops are about 0.372 inches of water at 2000 cubic feet per minute, 0.267 inches of water at 1600 cubic feet per minute, and 0.177 inches of water at 1200 cubic feet per minute.

In successful reductions to practice the hydrophobic risible filter is constructed of a synthetic microfiber nano layered media with a pleated design for excellent strength assuring optimum airflow. It has non-shedding, chemical-free binder fibers with inherent antimicrobial properties for an excellent service life and a heavy-duty frame for industrial applications. The filter measures about 25.5 inches wide, 22.5 inches tall, and four inches thick. It has a continuous temperature rating of 175 degrees Fahrenheit, and a spike temperature rating of 210 degrees Fahrenheit. Its MERV classification is MERV16/15-A, UL class 1, US Certified. The recommended airflow is 2000 cubic feet per minute at a velocity of 500 feet per minute, but can be operated at 125% of rated airflow. Pressure drops are about 1.02 inches of water at 2500 cubic feet per minute, 0.75 inches of water at 2000 cubic feet per minute, and 0.53 inches of water at 1500 cubic feet per minute. The recommended final resistance is about 2.5 inches of water.

FIG. 7 is a functional depiction of the controls discussed above in relation FIG. 1. A processor-based controller 140 receives parametric inputs from the temperature sensor 118 and from the pressure sensor 122, and, in turn, controls the operations of the variable speed drive ("VSD") 124, the damper 126, and the lockout ("L/O") circuit 120. FIG. 8 is a flowchart depicting steps in a method 200 for FUME COLLECTION in accordance with illustrative embodiments of this technology.

The method 200 begins with a call for powering the blower in block 202. At that point, the controller closes the damper in block 204 and passes control to the variable speed drive in block 206. The controller sets the blower speed via the VSD in response to receiving parametric inputs of plenum pressure from block 208. In block 210 it is determined whether a parametric temperature input from block 212 is greater than a predetermined threshold temperature value, "Tb." If the determination of block 210 is "yes," then the controller activates the lockout circuit in block 214 and opens the damper in block 216. If, on the other hand, the determination of block 210 is "no," then control passes to block 218 which determines whether a call for shutdown has occurred. In the event of the lockout being activated in block 214, the method ends. Otherwise, control returns to block 204 and normal operation proceeds.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

What is claimed:

1. A fume collection apparatus, comprising:
a wet collector enclosure defining an inlet;
a liquid bath inside the wet collector;
an inlet baffle inside the wet collector enclosure defining a channel from the inlet;
a blower in fluid communication with the wet collector enclosure and configured to draw fumes through the inlet, channel, and the liquid bath; and
an exhaust duct in fluid communication with the wet collector enclosure above the liquid bath.

2. The apparatus of claim 1 wherein the channel is configured to guide fumes entering the inlet to the subsurface of the liquid bath.

3. The apparatus of claim 1 comprising a baffle arrangement inside the wet collector enclosure above the liquid bath.

4. The apparatus of claim 3 wherein the baffle arrangement comprises overlapping first and second baffles defining a tortuous path for mixing the fumes by churning and agitating the liquid bath beneath the blower.

5. The apparatus of claim 1 comprising a dry collector enclosure in fluid communication with the wet collector enclosure.

6. The apparatus of claim 5 wherein the blower is between the wet collector enclosure and the dry collector enclosure.

7. The apparatus of claim 5 comprising a sacrificial filter in the dry collector enclosure.

8. The apparatus of claim 7 wherein the sacrificial filter comprises an oil scrim filter.

9. The apparatus of claim 7 comprising a hydrophobic filter downstream of the sacrificial filter in the dry collector enclosure.

10. The apparatus of claim 7 comprising a HEPA filter downstream of the sacrificial filter in the dry collector enclosure.

11. A fume collection apparatus, comprising:
a wet collector enclosure defining an inlet;
a dry collector enclosure defining an outlet; and
a blower inside a plenum between the wet collector enclosure and the dry collector enclosure, and configured to move fumes into the inlet and out of the outlet.

12. A fume collection apparatus, comprising:
a wet collector enclosure having an inlet through which fumes pass into the enclosure;
a liquid bath inside the enclosure;
an inlet baffle inside the enclosure defining an enlarged channel, extending from the inlet, through which fumes pass inside the enclosure to the liquid bath; and
a blower in fluid communication with the wet collector enclosure and configured to move fumes through the inlet, channel, and the liquid bath.

13. The apparatus of claim 12 comprising an exhaust duct in fluid communication with the wet collector enclosure above the liquid bath.

14. The apparatus of claim 13 comprising a damper in fluid communication with the exhaust duct.

15. The apparatus of claim 14 comprising a pressure detector.

16. The apparatus of claim 15 comprising a variable speed drive configured to selectively adjust a speed of the blower.

17. The apparatus of claim 16 comprising a processor-based controller processing computer instructions stored in a computer memory to selectively adjust the variable speed drive in response to reading a pressure value from the pressure detector.

18. The apparatus of claim 17 comprising a lockout circuit configured to selectively shut the blower off.

19. The apparatus of claim 18 comprising a temperature detector, wherein the controller processes computer instructions stored in the computer member to selectively activate the lockout circuit in response to a temperature reading from the temperature detector.

20. The apparatus of claim 19 wherein the controller processes computer instructions stored in the computer memory to selectively activate the damper in response to shutting the blower off.

\* \* \* \* \*